(12) United States Patent
Stummer et al.

(10) Patent No.: US 8,483,851 B2
(45) Date of Patent: Jul. 9, 2013

(54) METHOD FOR OPERATING AN ELECTRICALLY CONTROLLABLE TECHNICAL DEVICE AS WELL AS A CORRESPONDING CONTROL DEVICE

(75) Inventors: Heinz Stummer, Voecklabruck (AT); Guenter Lasinger, Gallneukirchen (AT)

(73) Assignee: Keba AG, Linz (AT)

( * ) Notice: Subject to any disclaimer, the term of this patent is extended or adjusted under 35 U.S.C. 154(b) by 455 days.

(21) Appl. No.: 12/736,529

(22) PCT Filed: Apr. 16, 2009

(86) PCT No.: PCT/AT2009/000153
§ 371 (c)(1),
(2), (4) Date: Nov. 12, 2010

(87) PCT Pub. No.: WO2009/126984
PCT Pub. Date: Oct. 22, 2009

(65) Prior Publication Data
US 2011/0077750 A1  Mar. 31, 2011

(30) Foreign Application Priority Data

Apr. 16, 2008 (AT) .................. GM223/2008

(51) Int. Cl.
*G05B 11/01* (2006.01)
(52) U.S. Cl.
USPC ................... 700/83; 700/17; 700/65
(58) Field of Classification Search
USPC .............................. 700/17, 65, 83
See application file for complete search history.

(56) References Cited

U.S. PATENT DOCUMENTS

| 5,901,366 A | 5/1999 | Nakano et al. |
| 6,167,464 A | 12/2000 | Kretschmann |

(Continued)

FOREIGN PATENT DOCUMENTS

| DE | 199 12 458 | 9/2000 |
| DE | 101 10 776 | 9/2001 |

(Continued)

OTHER PUBLICATIONS

International Search Report.

*Primary Examiner* — Charles Kasenge
(74) *Attorney, Agent, or Firm* — Collard & Roe, P.C.

(57) ABSTRACT

The invention relates to a method and a control device (2) for operating an electrically controllable technical device (1), in particular a machine, an installation, a device or a technical process. A control panel (4) with input means (6) for issuing control commands to the technical device (1) and for inputting data into the control device (T) by an operator (7) is provided in this case. This control panel (4) also comprises a graphics-enabled output means (8) for displaying subsets of information which is available overall for an operator (7). The important factor here is to provide at least one second screen layout, which is designed to display a second subset of information on the graphics-enabled output means (8) and is intended to be viewed from a relatively great distance, in particular from outside an immediate control range (9) of the control panel (4) or the technical device (1). Furthermore, the presence and/or absence of a person in the immediate control range (9) of the control panel (4) or the technical device (1) is detected automatically and automated changeover between a first screen layout and the second screen layout is effected on the basis of the determined state relating to the presence and/or absence of a person in the immediate control range (9) of the control panel (4) or the technical device (1).

30 Claims, 3 Drawing Sheets

U.S. PATENT DOCUMENTS

| | | |
|---|---|---|
| 6,367,020 B1 | 4/2002 | Klein |
| 6,374,145 B1 * | 4/2002 | Lignoul .................. 700/17 |
| 6,418,536 B1 | 7/2002 | Park |
| 6,477,594 B1 | 11/2002 | Tung |
| 6,480,753 B1 * | 11/2002 | Calder et al. ............. 700/83 |
| 6,536,658 B1 | 3/2003 | Rantze |
| 6,717,382 B2 | 4/2004 | Graiger et al. |
| 8,099,194 B2 * | 1/2012 | Chambers et al. ......... 700/83 |
| 2003/0102975 A1 | 6/2003 | Hache |
| 2003/0210258 A1 | 11/2003 | Williams |
| 2005/0015731 A1 | 1/2005 | Mak et al. |
| 2006/0132434 A1 | 6/2006 | Kern |
| 2007/0027561 A1 | 2/2007 | Dirnfeldner |

FOREIGN PATENT DOCUMENTS

| | | |
|---|---|---|
| DE | 696 33 360 | 9/2005 |
| EP | 0 741 479 | 11/1996 |
| GB | 2 348 093 | 9/2000 |
| JP | 61-070610 | 4/1986 |
| JP | 5-011713 | 1/1993 |
| JP | 2002-341796 | 11/2002 |
| WO | WO 2006/107245 | 10/2006 |

* cited by examiner

METHOD FOR OPERATING AN ELECTRICALLY CONTROLLABLE TECHNICAL DEVICE AS WELL AS A CORRESPONDING CONTROL DEVICE

CROSS REFERENCE TO RELATED APPLICATIONS

This application is the National Stage of PCT/AT2009/000153 filed on Apr. 16, 2009, which claims priority under 35 U.S.C. §119 of Austrian Application No. GM 223/2008 filed on Apr. 16, 2008, the disclosure of which is incorporated by reference. The international application under PCT article 21(2) was not published in English.

The invention relates to a method for operating an electrically controllable technical device, in particular a machine, an installation, a unit or a technical process, as well as a corresponding control device for such a technical device, as described in claims 1 and 17.

From JP 5-011713 A and U.S. Pat. No. 6,418,536 B1 technical embodiments are known in which an infrared sensor is combined with a display and the display or the computer are only switched on when a user is located immediately in front of it. The purpose of these embodiments is to save power or to extend the lifetime of the display.

Furthermore, it is known from U.S. Pat. No. 6,367,020 B1, to equip a personal computer or its screen with a proximity sensor, for example an ultrasound, infrared or electromagnetic sensor and in the absence of a user to darken the screen automatically and protect it with a password. Said proximity sensor can also be formed by a sensor, which is suitable for detecting the weight of a user.

From US 2003/0210258 A1 it is also known in the field of personal computers to detect the position of the user in front of the screen by means of several proximity sensors and depending on the result to implement zoom and scroll functions of a specific view on the screen, for example a map.

From U.S. Pat. No. 6,536,658 B1 it is known in an application for bank or sales dispensers and for advertising platforms, as a function of the sensor-detected identification of a consumer to start the dispenser from standby or adopt a defined operating status when leaving the dispenser and for example show advertising films or a login screen.

In the sphere of industrial control systems no comparable solutions are known. The situation to date is such that in industrial production halls there are often a plurality of substantially fully automatically operating production machines, such as e.g. a plurality of injection moulding machines. A single operator or machine attendant generally watches and monitors several machines and usually only intervenes in the case of special incidents or operational states. In particular, the operator only needs to step in if the production system is unable to react or cannot react sufficiently independently, if e.g. it is necessary to refill with material, collect finished parts, remove malfunctions, perform maintenance, cleaning or adjustments, check and adjust quality-relevant process parameters or the like.

The total number of parameters, measurement values and status data, which characterise the operation and the operational status of a production machine or the production process, is generally considerable in such a case. For the programming, operation and parameterisation of such machines therefore powerful man-to-machine-interfaces are required, which today as a rule comprise a plurality of input elements in the form of switches, buttons or button fields, a touch screen, and a relatively high-resolution and large area screen. Usually such man-to-machine interfaces are designed as operating terminals, which are integrated into the machine or in the vicinity of the respective machine, such as e.g. in front of the switch cabinet or the machine housing. Said stationary operating terminals are able to display large amounts of information simultaneously and clearly and show complex sequences and menu structures in a visually suitable manner. In programming and adjusting processes and when removing faults in the machine the full complexity of the information display is required. However, this is not required for all operational states or types of system.

The underlying objective of the present invention is to create methods and devices, by means of which the operator or the service staff of an electrically controllable technical device can perform the monitoring in a comfortable and failsafe manner and make any necessary changes to operationally relevant parameters.

Said objective of the invention is achieved by means of the method steps according to claim 1 and by a control device according to claim 17.

It is advantageous in this case that the presence or absence of a person in the immediate vicinity or operating area of the control panel is determined automatically and as a result of this automatic determination there is an automatic change in the screen display between a detailed view, which is better for observing from the immediate vicinity, and one or more views with only relatively few characteristic process values, which are provided for viewing from a greater distance. In particular, in this way the respective person can also perform relatively easily optimal monitoring or visual checking of the relevant process values that are of interest even outside the immediate operating area which is defined as the area directly in front of the usually stationary operating panel. This means that the respective person, in particular an operator or service staff, need not stand continually in the immediate vicinity of the stationary control panel, but the person responsible can also be positioned slightly further away from the control panel and still be able to evaluate the respectively relevant process data or information. For example, the responsible person can be directly or relatively close to the corresponding technical device and thus observe the respective technical process, such as e.g. workpiece processing or manufacturing process as exactly as possible. In particular, the respective person can be positioned in a suitable place, in order to inspect the corresponding sequence as well as possible. At the same time the responsible person can read the relevant process data or other information on the screen of the stationary control panel or determine its contents and thus control the sequences in an optimal manner. In addition, it is possible to make various changes to settings directly on the technical device and at the same time follow the respective display values, in particular the corresponding actual values on the screen of the stationary control panel. In this way, many programming activities or new settings can be performed comparatively rapidly and specifically. A main advantage is also that the switching between the detailed and finely structured screen layout and the comparatively simply configured screen layout, which is designed for observation from a larger distance, is performed automatically and in this way it is increasingly comfortable to use. In addition, there can also be an increase in the availability and trouble-free functioning of the technical device, since the responsible person, as a function of their relative position to the screen of the fixed control panel without additional effort, is always provided with continually optimised screen views.

An embodiment according to claim 2 is also advantageous, as thereby a distinction is made automatically between general staff and authorised operators. In particular, by means of said further measures switching to the first screen layout designed for setting, monitoring or programming activities is only performed, if an authorised operator is recognised and identified in the immediate vicinity of the control panel. In this way undesirable changing screen views are avoided, if general persons are detected in the vicinity of the control panel or outside the immediate control area. This means that in this way unnecessary and inappropriate switching processes can be prevented and the advantageous changes of screen are only limited to a specific or relevant group of people. According to an advantageous, optional development in this way if necessary also automatic access protection measures can be implemented, since switching to the first screen layout, which as a rule offers a series of setting and programming options, is only performed if an authorised person has been detected. All other people, in particular unauthorised passers-by are thus automatically prevented from changing relevant system parameters or inspecting detailed data.

The measure according to claim 3 is also an advantage, as in this way it is possible to switch completely automatically to the screen layout designed for observation from a greater distance. Thus the temporary forgetfulness or carelessness of the operator does not result in a reduction in comfort or a worsening of the monitoring safety of the various processing states or parameters of the technical device. In addition, in this way a much greater degree of operational comfort is achieved, since manual switching processes are unnecessary. As a consequence also the time periods during which an operator is occupied with the programming or operation of the control panel, can be kept as low as possible so that the operator can concentrate on more relevant and useful activities.

Furthermore, a measure according to claim 4 is advantageous, as in this way without requiring additional structural measures the presence of a person can be detected or identified. In particular, only software-technical implementations are necessary, in order to detect automatically the presence of a person. Said measures thus enable a particularly inexpensive implementation of the method according to the invention. Furthermore, also already existing technical devices or control devices can be adapted in a simple manner, in order to be able to be operated subsequently according to the method of the invention.

The measures according to claim 5 are also advantageous, as in this way in a simple and relatively inexpensive manner an automatic change in screen views can be implemented. In particular, no structural measures are necessary in order to determine the absence of a person, but simply the expiry of a specific time period is the criterion for the fact that no operator is in front of the control panel. It is also a particular advantage that by way of these measures also already existing technical devices or control devices can be provided simply with an update, in order to implement the operating method according to the invention.

Furthermore, the measures according to claim 6 are also advantageous, as in this way an optimal adjustment to different technical devices, in particular to the respective operating complexities or the respective system data, is made possible in a simple manner.

Furthermore, the measures according to claim 7 are an advantage, as in this way a signal of a specially designed sensor is used, in order to determine the presence or absence of persons automatically. In particular, in this way the actual status is determined and the presence of persons is not determined simply by way of incidental effects or general conditions. The corresponding measure thus provides a particularly reliable result and reliability of detection.

Also the measures according to claim 8 are advantageous, as in this way the correct function of the presence sensor is checked automatically. In particular, when activating any of the input means on the control panel in principle it is assumed that a person is in the immediate vicinity of the control panel. The presence sensor should thus provide at the same time a corresponding presence signal. If this is not performed, the presence sensor is either defect or its sensitivity and detection range need to be adjusted accordingly. This adjustment can in this case be performed automatically and unnoticed by the operator. An advantage of these measures is that a periodic or stochastic functional check of the presence sensor is performed automatically and any disruption or unfavourable setting can be recognised immediately as soon as it occurs and can be signalled or dealt with accordingly.

The measures according to claim 9 are also advantageous, as in this way if necessary a static or fixed preadjustment can be performed. In particular, in this way automatic switching processes can be deactivated, if the latter is not desirable or expedient for special incidences of use, in particular for special adjustments on the technical device.

By way of the measures according to claim 10 it is ensured that the operator of the technical device has all of the information or data available which are required mainly for the programming or new set-up of the technical device. In particular, the operator is provided automatically with such data, screen views and detailed information, which are required in order to undertake new programming or make new settings. This high degree of detail is particularly advantageous, if in the immediate operating area of the control panel there is an authorised operator. The comparatively simple presentation of the second portion of information with reduced informational content is however particularly advantageous in order to observe and monitor the most important parameters from a greater distance, in particular at distances, at which it is no longer possible to activate or reach the input means of the control panel.

In the measures according to claim 11 it is an advantage that during the trouble-free and essentially fully automatic operation of the technical device only some less characteristic process parameters and measurement values are reproduced. From a personal control of these reduced and most essential process parameters and measurement values it is still possible to make a reliable assessment about the trouble-free operation of the technical device. Too detailed a view of a plurality of additional parameters would however make it more difficult to detect essential variables or any deviation might not be noticed from the expected reference values in some circumstances or not with a suitable reaction time. In addition, by way of the measures according to claim 11 the most important process parameters can be detected easily even at greater distances in relation to the screen of the control panel. Furthermore, on this basis from different positions on a larger machine the relevant process parameters on the stationary screen can be monitored and controlled relatively comfortably, without making it necessary to step up directly to the control panel.

The measures according to claim 12 are also advantageous in that in this way the operation can be performed in a relatively power-saving manner, wherein the respective measures are introduced automatically for power saving. By means of the following automatic reactivation of the screen there is no decrease in the reliability of the system or with respect to the greatest degree of availability of the technical device.

A further increase in the potential saving of electrical power is achieved by way of the measures according to claim 13.

The measures according to claim 14 are also particularly advantageous, as in this way a distinction is made automatically between a general group of people and an approved and authorised group of people. In particular, it is made possible in this way to make the switching processes or the change of screw views dependent on the identity or authorisation of the respectively detected person. This means that at least the automatic change in view to the first screen layout can be restricted in that the first screen layout is only switched to on the identification of an authorised operator, as soon as the authorised operator is located in the immediate operating area in front of the control panel. Numerous, possibly confusing switching processes can be avoided in this way with regard to the screen view.

The further measures according to claim 15 are also advantageous, as in this way in a simple manner a defined detection area can be implemented, which is covered substantially by the physiologically possible or sensible operating area in front of the control panel. In particular, the detection zone for the contactless detectable information carrier can correspond to the possible operating area in front of the control panel, so that by way of the measures for the personal identification or authorisation check the respective operating area and the corresponding switching condition are defined.

Also the measures according to claim 16 are advantageous, as in this way the corresponding group of people do not need to carry any identification or information carriers and yet still a reliable detection of the identity or authorisation of the respective person can take place. In particular, if the corresponding person is located in the immediate operating area in front of the control panel, a corresponding personal identification or authorisation check can be performed in a simple and reliable manner.

An independent solution to the aforementioned problem is described in claim 17. The technical effects and advantages achievable by means of this solution according to the invention are described above.

In the development according to claim 18 it is an advantage that optionally an integral detection device is created or a modular connection to a corresponding detection device is possible to the control and a suitable integration of the desired mode of action into the control sequence is made possible in a simple manner. A particular advantage of the measures described is that a distinction is made automatically between a general group of people and an authorised operator, so that the automatic change in the screen view is also dependent on the authority or on the function of the respective person. In this way e.g. sensory overload and unnecessary switching processes of the screen view can be avoided.

Also the measures according to claim 19 are advantageous as in this way presence sensors can be used, which have a relatively narrow and clearly defined detection range. In this way an inexpensive structure is possible and in addition there can be a high degree of insensitivity to problems and external influences.

By way of the measures according to claim 20 a reliable detection can be performed and irrelevant interference levels or signals can be eliminated or filtered out in a simple manner.

The measures according to claim 21 are also advantageous, as in this way a selection and representation of information automatically adjusted to the respective situation and observation distance relating to the operating status of a machine or another technical device is provided. In particular, in this way automatically or partly automatically and according to the situation it is possible to switch between the optimal or optimised viewing forms or screen layouts, in order to correspond to the respective conditions as well as possible and in order to adjust the respective screen view in automated form.

The embodiment according to claim 22 enables the setup of an inexpensive and yet completely functionally reliable detection device relating to the presence or absence of persons. It is also particularly advantageous that the detecting zone or the detection range can be predefined or delimited exactly in spatial terms Also an embodiment according to claim 23 is advantageous, as in this way in addition to the option of detecting the presence or absence of objects, in particular persons, in a simple manner the distance or movement direction of an object or a person can be determined.

Furthermore, an embodiment according to claim 24 is advantageous, as in this way the respective persons need not bring or carry any identification and also no PIN codes or the like have to be noted or kept ready. In particular, in a simple manner by way of biometric features, in particular by means of a finger print, an iris image of the human eye, a facial feature or the like the identity and then the respective authorisation of a person can also be determined automatically.

The embodiment according to claim 25 is also particularly advantageous, as such a presence sensor is structurally simple and can be integrated functionally in a relatively uncomplicated manner into the control sequence of the control device. Furthermore, a switching criterion which can be performed clearly by the operator is described by means of which confusion and uncertainties with respect to the automatic switching of the screen view are excluded. In addition, in this way the comfort and ergonomy are increased for the respective operator.

The reliable detection of movable or displaceable objects, in particular of people, can be achieved by means of the embodiment according to claim 26. A further advantage is that by the arrangement of several light barriers in a simple manner also a direction of movement can be detected and at the same time a defined detection zone or a spatially limited detection area can be determined or defined.

In the embodiment according to claim 27 it is an advantage that in this way the presence of an operator in the vicinity of the control panel can be detected automatically and essentially without contact. Furthermore, in this way an identification can be read out from the transponder carried or produced by the person. In addition, personal allocations or identification or authorisation checks can be converted in a simple and reliable manner.

Also an embodiment according to claim 28 is advantageous, as in this way a much more deliberate application is required in the system and the unwanted switching of the screen views is avoided. Still by means of such a barcode reading device and corresponding barcodes to be carried by the operator a greater degree of handling comfort can be achieved.

Also the measures according to claim 29 are advantageous, as in this way a simple adaptation of the control device to the respective environmental conditions or system structures is made possible. In particular, in this way area adjustments can be made to the area, or zones can be darkened in which an automatic change in the screen view would be undesirable.

Lastly, an embodiment according to claim 30 is advantageous, as in this way by the respective operator a particularly simple and comfortable adjustment of the desired detection behaviour or the optimal detection area can be performed in a simple manner.

For a better understanding of the invention the latter is explained in more detail by way of the following Figures.

In a much simplified representation.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

Figure 1:
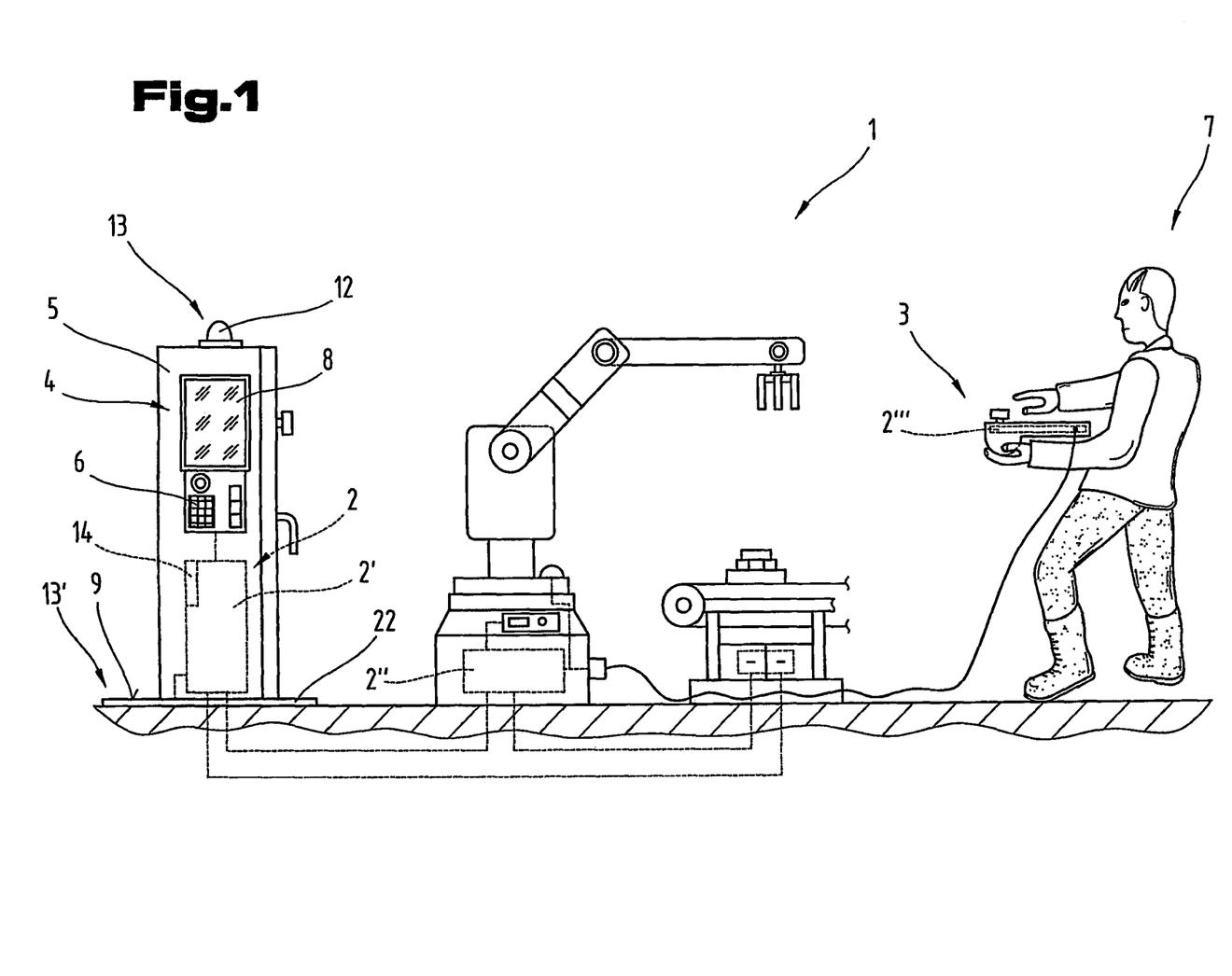
FIG. 1 shows by way of example a technical device with technical means for the automatically controlled switching of the visually detectable views on a control panel of the control device.

FIG. 1 shows an exemplary embodiment of an electrically controllable or electrotechnically controlled technical device 1. Said technical device 1 is formed for example by a technical installation, which comprises at least one machine and an industrial robot, in order to perform a production process at least partly automatically. The technical device 1 can in this case comprise any machines, installations and devices, in order to automatically perform technical processes, in particular production processes, chemical processes or the like, at least partly in an automated manner. Such devices 1 can also be defined as industrial automation systems.

The corresponding technical device 1 comprises at least one signal and data-processing control device 2, which can be composed of individual control units 2'-2'''. The respective control architecture for the technical device 1 can in this way comprise any topologies known from the prior art. In particular, central and decentral control architectures and any mixed forms are possible. Thus it is also possible for example to integrate mobile control units 2''', in particular so-called hand terminals 3, into the control device 2. Likewise random, signal and data technical networks can be provided between the respective control units 2'-2'''.

Furthermore, at least one control panel 4 is formed, which is operatively connected to the control device 2 or is combined structurally with at least one control unit 2'-2''' of the control device 2. The control panel 4 can in this case be positioned separately from the technical device 1 and formed for example on a switch cabinet 5, a control console or a positioned control console. In the shown exemplary embodiment the control panel 4 is installed into the side or front wall of the switch cabinet 5. This means that the control panel 4 is positioned to be fixed and is usually not provided for repositioning relative to the technical device 1.

On the control panel 4 or in the immediate vicinity of the control panel 4 at least one input means 6 is formed, which is provided for the delivery of control commands to the technical device 1 and for the input of data into the control device 2 or for retrieving or changing information or data by an operator 7. In particular, the input and output of data is made possible in relation to the control device 2 or a change in the mode of operation of the technical device 1 by means of the various input means 6.

The control panel 4 also comprises at least one graphic output means 8 for representing portions of all available or necessary information for the operator 7 of the technical device 1. The graphic output means 8 is used in particular for the output of status information on the operating or processing status of the controllable technical device 1. In addition to a graphic output means 8 in a known manner also other visually detectable output means, such as e.g. signal lights, pointer instruments and the like can be provided. The output means 8 can be formed according to a preferred embodiment also by a contact sensitive screen, in particular by a touch screen. Such a touch screen combines a graphic output means 8 with an input means 6 for influencing the mode of operation of the control device 2 or the technical device 1.

The operation of the control panel 4 and its input means 6 is possible ergonomically in principle only within an immediate operating area 9 around the control panel 4. In particular, within this spatially limited operating area 9, which corresponds to the immediate vicinity around the site of the control panel 4, access is provided to the input means 6 of the control panel 4. Within said control area 9 in addition all of the information represented graphically on the output means 8 of the control panel 4 can be viewed or read by an operator 7. Outside the control area 9 around the control panel 4 it is no longer possible to operate the input means 6 and it is difficult or not possible to inspect or read all of the available information of the output means 8.

It is essential that the control device 2, which comprises one or more control units 2'-2''', provides at least one first screen layout 10, which is designed for the representation of a defined portion of all existing information or data on the graphic output means 8. By way of example a first screen layout with a view of an exemplary, first portion of information is shown schematically in FIG. 2.

The control device 2, in particular at least one of the control units 2'-2''' is also designed for providing at least one second screen layout 11. Said second screen layout 11 is set up or designed for the representation of a defined, second portion of all available information on the graphic output means 8, as shown schematically and by way of example in FIG. 3. Said second screen layout 11 is designed in any case for representing a second portion of information on the graphic output means 8 which is usually reduced with respect to the scope of information and is provided for observation from a comparatively greater distance from the graphic output means 8. In particular, the second screen layout 11 is provided for inspection by an operator 7 from surrounding areas, which lie outside the immediate operating area 9 of the control panel 4 or technical device 1. The second screen layout 11 preferably comprises less detailed information or comparatively larger views on the graphic output means 8, in order to allow observation or reading even from greater distances, in particular from distances clearly away from the immediate control area 9. Said surrounding areas lying outside the immediate control area 9 can for example be formed by the site of the respective tool manipulation or product processing within the technical device 1 or by sections between technical devices 1, which sections are regularly or sporadically entered by at least one person or operator 7.

In this connection it is essential that also the detection of the presence or absence of a person in the immediate operating area 9 of the control panel 4 is performed automatically. In particular, the detection of the presence and/or absence of a general person or an authorised operator 7 in the immediate operating area 9 of the control panel 4 or the technical device 1 is performed via the control device 2 of the technical device 1 or via the control panel 4. Said automatic detection of the presence or absence of a person or operator 7 in the immediate operating area 9 of the control panel 4 is performed by means of at least one presence sensor 12, which is operatively connected to the control device 2 or the control panel 4. Advantageous embodiments or functions of such a presence sensor 12 are described in the following.

It is also essential that the switching takes place automatically between the first and second screen layout 10, 11 by way of the fixed status with respect to the presence or absence of a person or operator 7 in the immediate operating area of the control panel 4. Said automatic switching is performed by means of the control device 2 or initiated or implemented by the presence sensor 12. The automatic switching can however also be made dependent on the presence or absence of a person in the vicinity of the technical device 1.

The control sequence is thus such that on establishing the presence of a person in the immediate operating area 9 of the control panel 4 it is switched to the first screen layout 10 or in this case the first screen layout 10 is activated. According to an advantageous development the switching to the first, relatively detailed screen layout 10 occurs if an operator 7 authorised to operate the technical device 1 or the control units 2'-2''' by the control device 2, i.e. an operator 7 authorised to undertake technical manipulation, is recognised in the immediate operating area 9 of the control panel 4. Said automatic activation of the first screen layout 10 makes it possible for an authorised operator 7, to achieve a more comfortable and comparatively rapid view of the various parameters or status information of the technical device 1. If necessary also an automatic activation of operating options with increased safety requirements can be performed or an automatic activation of access rights can be introduced automatically, which is only to be accessed by specific authorised operators 7.

However, if the absence of a person or operator 7 has been detected in the immediate operating area 9 of the control panel 4 the second screen layout 11 is activated. Also said activation or switching to the second screen layout 11 preferably occurs fully automatically. This means that no manual operating actions are necessary, in order to activate the second screen layout 11 on leaving the immediate operating area 9 of the control panel 4, which second screen layout is suitable for reading or detecting relevant or interesting portions of information from a greater distance. The carelessness or forgetfulness of the operator 7 therefore does not result in a reduction in the availability or trouble-free functioning of the technical device 1 or to unwanted safety deficits of the technical device 1.

The presence sensor 12 for detecting the presence and/or absence of a person, in particular an operator 7, can be designed to be structurally separate or designed as an integral component of the control device 2. In particular, the presence sensor 12 can be implemented such that on activating an input means 6 of the control panel 4 a conclusion is drawn about the presence of an operator 7 within the operating area 9. The presence sensor 12 can thus comprise hardware-technical components and/or can be purely in the form of software.

In a similar manner it is possible to establish the absence of an operator 7 on the control panel 4, in that on the input means 6 of the control panel 4 during a fixed time span any or specific control actions are omitted. In particular, the absence of an operator 7 can be assumed if for example during a time span of about 1 min no activation occurs on the input means 6. Preferably, said fixed first time span can be adjusted individually. In particular, said time span for the logical conclusion of the absence of an operator 7 can be adjusted within an area of 30 sec to a max. 5 min. In this way the respective conditions or the respectively required operating actions on the technical device 1 can be taken into account for a plurality of situations. According to an advantageous development the automatic switching between the first and the second representation form, in particular between the first and the second screen layout 10, 11 can be deactivated by a predefined operating action or parameter setting on the operating panel 4. In particular, a user-side inactive switching of the automatic display switching can be provided. Said user directed deactivation means that the first or the second screen layout 10, 11 remains switched on permanently regardless of the presence or absence of a person. In this way e.g. service or installation work or programming activities can be performed more easily or more rapidly and more comfortably.

According to an advantageous development it is also possible that after the expiry of a second time span, in which the absence of persons has been established continually, a screen, in particular an LCD (Liquid Crystal Display) of the graphic output means 8, is darkened or switched off. With the subsequent automatically established presence of a person or operator 7 in the operating area 9 of the control panel 4 the first screen layout 10 is reproduced or shown automatically. Likewise, if the presence of person is established within a defined surrounding area around the technical device 1 the second screen layout 11, which is suitable for observation from a greater distance, is reactivated, i.e. output on the screen of the control panel 4. According to an optional development during or immediately after the darkening or switching off of the screen in the control panel 4 also various hardware components, which are necessary for the output of information on the screen, are switched off or put into standby mode. The thus achievable power savings have an advantageous effect on the environment and also the unnecessary distraction of persons working in the surrounding area of the device 1 is avoided. Furthermore, sensory overloads based on large amounts of partly irrelevant information, which usually affects people in area of the technical device 1 can be avoided with this measure in a simple and effective manner.

Alternatively, or in combination with the detection of operation actions on one of the input means 6 it is also possible, to establish the presence or absence of a person within the immediate operating area 9 by means of a signal or status information of the presence sensor 12. The presence sensor 12 can thus be designed as a proximity sensor, the output signals or output switching states of which are utilised or evaluated by the control device 2.

According to an advantageous development on operating a predefined input means 6 of the control panel 4 or upon the manual instigation of a checking routine on the control panel 4 a function or plausibility check of the presence sensor 12 is performed. There can also be a new setting or adjustment of the operating parameters of the presence sensor 12. In particular, in this connection the sensitivity or the spatial detection range of the presence sensor 12 can be changed or readjusted.

Independently of this, there can be an automatic functional check of the detection device 13 or the presence sensor 12 as follows: on operating any one of the input means 6 on the control panel 4 by the control device 2 the presence of a person in the immediate vicinity of the control panel 4 can be assumed. The presence sensor 12 should thus indicate at the same time the presence of a person. If this does not happen, the presence sensor 12 or the detection device 13 is either defective or set inappropriately, so that an error message or a request for adjustment is given. Alternatively or in combination therewith, there can be an automatic switching to a sensible alternative operating behaviour or the detection sensitivity should be adjusted accordingly. This can also be performed automatically and unnoticed by the operator 7.

The presence sensor 12 can be defined as a component or functional component of a detection device 13, which is designed for determining the presence and/or absence of a person or operator 7 in the immediate operating area 9 of the control panel 4. Said detection device 13 can in this case be integrated functionally into the control device 2, in particular into one of the control units 2'-2''', or also designed to be structurally independent and in operative connection with the control device 2 or directly with the control panel 4. The respective detection results of the detecting device 13 are used, in order to cause automatic switching between at least one first screen layout 10 for viewing from a close distance and at least one second screen layout 11 for viewing from a greater distance. In particular, the first screen layout 10 is provided primarily for viewing from the immediate operating area 9, whereas the second screen layout 11 is provided for observation from a comparatively greater distance, in particular for observation from areas outside the immediate operating area 9. From the control device 2, in particular from one of the control units 2'-2''', the first screen layout 10 for creating a first screen representation, which should comprise a first portion of all available information, is retrievable from a memory 14, in particular from an electronic or magnetic data memory.

Figure 2:
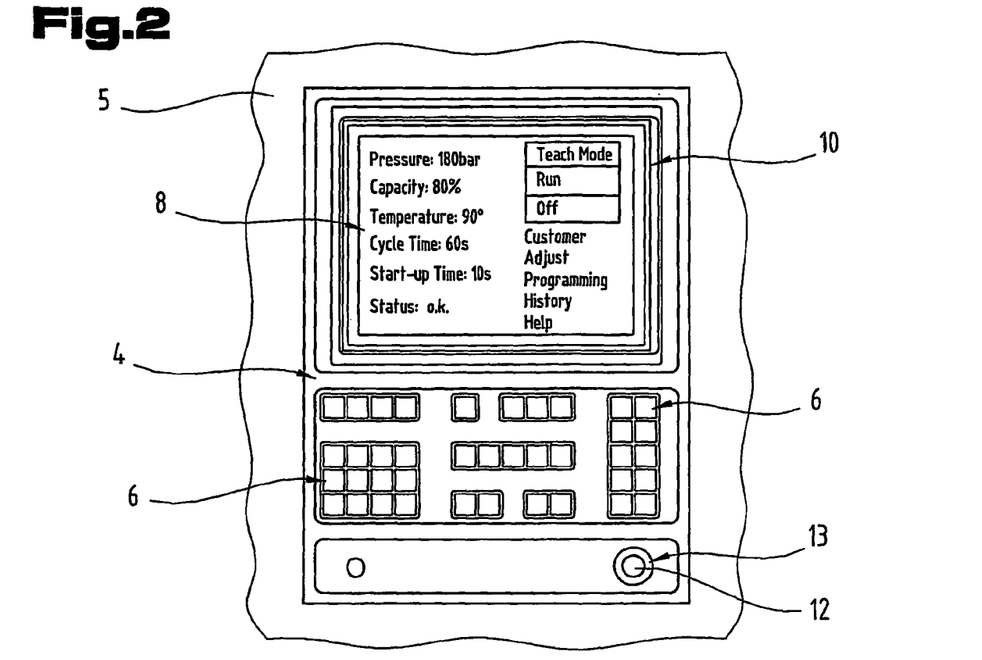
FIG. 2 shows an example of a first screen layout of the control panel according to FIG. 1.

The first screen view provided by the corresponding programming or the corresponding first screen layout 10 is provided for viewing information or status messages in the immediate vicinity of the control panel 4. In particular, the first screen layout 10 is generated by the control device 2 such that within the operating area 9 of the control panel 4 it is legible or visually detectable by an operator 7. Said first screen view contains information which is useful for checking by an operator 7.

Figure 3:
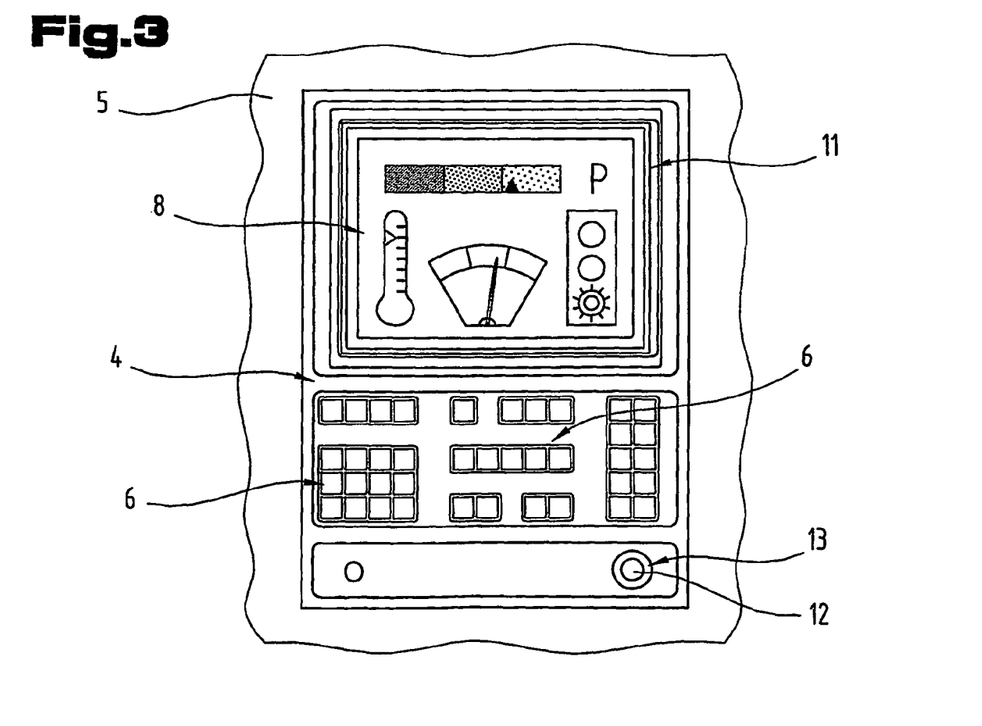
FIG. 3 shows an example of a second screen layout of the control panel according to FIG. 1.

It is essential that by the control device 2, in particular by at least one of the control units 2'-2''', in addition at least one second screen layout 11 for generating at least one second screen view can be instigated. Said second screen layout 11 is provided for showing a second portion of all available information. The structural form or the structural definitions of the second screen layout 11 can be instigated by the control device 2 or by at least one of the control units 2'-2''' from an electronically administrable memory 14 for data and programs. Said second screen view or said second screen layout 11 is provided in this case for observation from greater distances. In particular, there is an optimised view of the respective screen from areas outside the immediate operating area 9 of the control panel 4 or the technical device 1. It is essential that as a function of a detection result or detection value or based on an output signal of the detection device 13 the switching between the first and second screen view 10, 11—and vice versa—is automatic. In particular, having established the presence of a person, in particular an operator 7, in the immediate operating area 9 of the control panel 4 information is output on the graphic output means 8 of the control panel 4 according to the first screen layout 10. However, if it is established that no one, in particular no operator 7, is within the immediate operating area 9 of the control panel 4, information is output on the graphic output means 8 according to the second screen layout 11. In this way the viewing and monitoring of relevant status information can be performed relatively easily by means of the technical device 1 or a reliable content detection of the screen display even from a greater distance from the stationary control panel 4. The screen contents which can still be read from a greater distance are in this case reduced to essential information, in particular system-critical information or otherwise interesting information, in particular information relative to relevant adjustment data of the technical device 1.

The at least one detection device, possibly also multiple detection devices 13, is preferably arranged within the assembly area of the technical device 1 and comprises at least one presence sensor 12, which is designed for detecting the presence of persons, in particular operators 7 in the vicinity of the control panel 4. Said presence sensor 12 can in this way be formed by any sensors or measures known from the prior art, in order to automatically identify the presences of a person within a defined area of the operating area 9.

To filter error signals or avoid unwanted switching processes in the control device 2 and/or in the detection device 13 software-technical filter means can be implemented. Said measures should ensure a reliable or error-free evaluation of an output signal or result value of the presence sensor 12. It is advantageous, if the presence sensor 12 comprises a defined response hysteresis with an upper and a lower switching threshold.

As can be seen best from a comparison of FIGS. 2 and 3, the first screen layout 10 comprises a specific portion of all available information via the technical device 1. Said first portion of information has a relatively high degree of detail or a relatively high information density. In particular, the first screen layout 10 is provided for a screen output with a comparatively high degree of representation or information depth, in order thus to be able to perform for example associated status checks or branching within a program menu and/or to introduce program activities with respect to the technical device 1. This means that in the first screen layout 10 for example a plurality of parameters regarding the technical device 1 can be read and/or adjusted. In addition, in the first screen layout 10 there can be a plurality of setting menus or program menus, by means of which branching can occur into very different submenus.

The second screen layout 11 shows primarily the most essential information, which can be useful or relevant for an operator 7 for inspection from a greater distance. In particular, this can be system-relevant status information about the operating or processing status of the controllable, technical device 1. The second screen layout 11 thus comprises information provided for continuous or periodic inspection by an operator 7. Said information may be of a manufacturing or product-specific nature and/or of a system-relevant nature relating to the technical device 1. In particular, for the second screen layout 11 relevant temperature or pressure values, various status displays such as e.g. traffic light symbols, various progress displays such as e.g. bar diagrams, display scales with pointers of value displays and the like can be provided. The respective type of representation and character size is selected in this case such that the respective information can also be determined visually from a greater distance from the immediate operating area 9. Accordingly it is partly the case that the first screen layout 10, which is provided for showing detailed information, largely uses smaller character sizes and/or smaller graphics than the second screen layout 11, which only shows an extract of system-relevant or otherwise interesting information and thus enables comparatively larger views on the screen of the control panel 4.

According to an advantageous development the detection device 13 in addition to or independently of the detection of information on the physical presence or absence of a person can also be provided for detecting information about the identity or authorisation of the respective person. The detection device 13 can thus be designed such it can distinguish between general people and authorised operators 7. In particular, if the detecting device 13 also detects the identity or authorisation of a person detected in the vicinity of the technical device 1, an automatic distinction can be made between a general or unspecific person and an authorised operator 7, who is authorised to change settings on the technical device 1 and/or view specific information. Mainly, the automatic switching between the second, relatively simple screen layout 11 and the first relatively detailed screen layout 10 can be performed on the condition that the detected person has been recognised by the detection device 13 as an authorised operator 7. If during this automatic detection of the authorisation or identity of the person it is established that the detected person also has corresponding administrator rights for the respective technical device 1, thus on the entry of said operator 7 into the operating area 9 it is automatically switched to the first screen layout 10, which then allows the inspection of the corresponding detailed information or a change in system-critical or system-relevant setting in a simple or comfortable manner.

Figure 4:
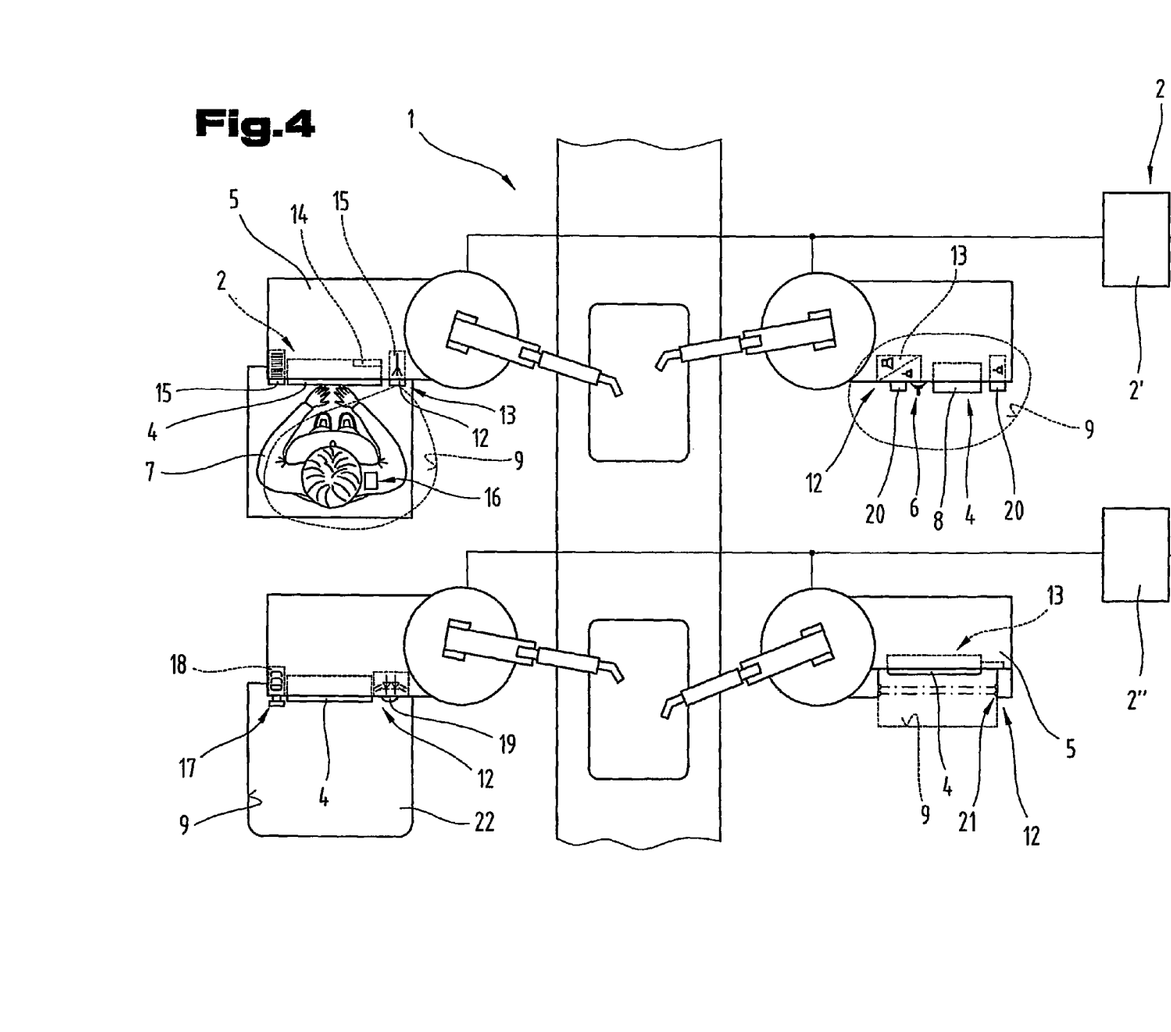
FIG. 4 shows various devices for detecting the presence or identity of a person within the immediate operating areas of various control panels.

In order to perform said personal identification or authorisation check the detection device 13 comprises a reading device 15 for contactless detectable information carriers 16. The reading device 15 for personal identification or for checking the authorisation can of course also be designed to be separate or independent of the detection device 13. The contactless detectable information carriers 16, which are assigned to the authorised operator 7, in particular carried by the latter, can be formed e.g. by transponders, barcodes, RFID-labels or the like. On the information carrier 16 in this way the respective authorisation data and/or identification data of the respective carrier of the information carrier 16 are saved. Alternatively to this on the information carrier 16 also an identifier can be saved, which is virtually a "pointer" for a corresponding dataset, which can be retrieved and evaluated by the control device 2. It is advantageous in this case, if said contactless detectable information carrier 16 is carried by the authorised operator 7 such that on approaching the detection device 13 or the reading device 15 there can be an automatic or automated detection of the respectively saved information or data. This means that also the detection range of the information carrier 16 or the detection sensitivity of the detection device 13, in particular the reading device 15, can be used for delimiting or defining the operating area 9. In particular, the detection range or detection sensitivity between the reading device 15 and the information carrier 16 can represent a condition or a criterion with regard to the automated switching between the first and second screen layout 10, 11—and vice versa.

Alternatively to checking a person by means of a computer supported evaluated information carrier 16 it is also possible to perform a personal identification or an authorisation check of people by means of a camera 17 of an imaging sensor 18, in particular a CCD module, and software for image or object identification. Said software is in this case designed in the detection device 13 or processed in the control device 2. By means of such measures authorised operators 7 are released from carrying or using special information carriers 16. In particular, an authorisation check of people can be performed solely by means of unmistakable features such as, e.g. facial features, iris patterns, finger prints or other biometric features.

According to the above explanations the presence sensor 12 can thus be formed by an imaging sensor 18, in particular a CCD module or camera 17. On the other hand, the presence sensor 12 can be designed for detecting the presence of an authorised operator 7 also by a transponder reading device 15 or by a barcode reading device 15.

The presence sensor 12 for detecting persons in the immediate operating area 9 of the control panel 4 can however also be formed by at least one infrared proximity sensor 19. Alternatively or in combination with this the presence sensor 12 can also be formed or designed by at least one ultrasound proximity sensor 20. The said proximity sensors 19, 20 are preferably arranged in the immediate vicinity of the control panel 4 and define with their respective detection area the immediate operating area 9 around the control panel 4 or in front of the control panel 4. This means that the infrared proximity sensor 19 or the ultrasound proximity sensor 20 is defined or covered by means of the respective detection area 9.

The presence sensor 12 for automated detection, whether a person is located within the operating area 9 in front of the control panel 4 can also be formed by at least one light barrier 21. Said light barrier 21 can in this way be designed as a reflection light barrier or as a one-way light barrier, in which the transmitter and receiver are opposite one another. The light barrier 21 can also be designed for radiating a light grid or light curtain and therefore operate with several light beams. In particular, the light barrier 21 can monitor a specific area or a defined operating area 9 with regard to position-variable objects, in order in this way to come to adequate conclusions about the presence or absence of an operator immediately in front of the control panel 4.

According to an advantageous embodiment the presence sensor 12 can also be formed by a weight-sensitive tread mat 22. Said tread mat 22 is positioned in front of the operating panel 4 and defines the automatically monitored operating area 9. In particular, the area extension and the positioning of the weight-sensitive tread mat 22 in the operating area 9, which is crucial for automatic switching between the first screen layout 10 and the second screen layout 11. As soon as a person or an operator 7 steps onto the tread mat 22, by means of the control device 2 the presence of a person in front of the control panel 4 is identified, whereupon the screen views are output according to the first screen layout 10.

If the tread mat 22 is unloaded however graphical views on the screen of the control panel 4 are converted to the second screen layout 11, the views of which are also clearly legible and decipherable from a relatively large distance. The design of a tread mat 22 is particularly advantageous as in this way for a person or operator 7 the automatic switching criterion is clearly identifiable, and there is no possibility of mystification or confusion with regard to the automatically changing screen views. In addition, the arrangement of an elastically flexible or antislip tread mat 22 in front of the control panel 4 can be healthy for the operator 7 and contribute to a working environment that is as comfortable as possible. Furthermore, the integration of a tread mat 22 into the control sequence of the control device 2 or the operating panel 4 in order to achieve an automated screen switching process is relatively simple in structural terms and also inexpensive to implement.

The sensors or detection means described above are line-connected with the detection device 13 or with the control device 2 or directly with the control panel 4.

It is expedient, if the control device 2, the detection device 13 or the presence sensor 12 is designed such that a response threshold of the presence sensor 12, in particular the distance for identifying the presence of a person can be parameterised individually or as a function of the system. In particular, the sensitivity or the detection range of the detection device 13 should be able to be changed or adjusted within a specific adjustment range.

In addition, it can be advantageous that the control device 2, the detection device 13 or the presence sensor 12 is designed such that the response threshold for an automated switching process can be parameterised. Furthermore, it is advantageous, if the response threshold can be adapted to be automated, in that during the activation of an input means 6 of the control panel 4 the response threshold for the switching is reset automatically. In particular, during the activation of an input means 6 of the control panel 4 and the thereby determined output signal or result value of the presence sensor 12 the switching threshold or response threshold are newly defined or newly adjusted. The effort of entering new settings or adjustments or the necessary adjustment time can be much reduced in this way and the overall ease of making adjustments is increased essentially in this way.

One of the advantageous effects of the method according to the invention or the control device 2 according to the invention is that the operator 7 of a machine can still determine the most important process and machine information at a greater distance from the control panel 4. The switching between the viewing formats is performed automatically and is not connected to any operating action. The change in the screen layout is therefore performed rapidly and reliably. Furthermore, in areas where e.g. work gloves are required a comfortable and rapid workflow can be achieved. Furthermore, none of the operating elements can get dirty, as no special operating actions are required in order to switch or adjust the screen output.

The exemplary embodiments show possible embodiment variants of the system according to the invention, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field.

Thus all conceivable embodiment variants, which are made possible by combining individual details of the embodiment variants shown and described, are also covered by the scope of protection.

Finally, as a point of formality, it should be noted that for a better understanding of the structure of the control device 2, the latter and its components have not been represented true to scale in part and/or have been enlarged and/or reduced in size.

The underlying problem addressed by the independent solutions according to the invention can be taken from the description.

Mainly the individual embodiments shown in FIGS. 1; 2; 3; 4 can form the subject matter of independent solutions according to the invention. The objectives and solutions according to the invention relating thereto can be taken from the detailed descriptions of these figures.

| List of Reference Numerals | |
|---|---|
| 1 | Technical device |
| 2 | Control device |
| 3 | Hand terminal |
| 4 | Control panel |
| 5 | Switch cabinet |
| 6 | Input means |
| 7 | Operator |
| 8 | Output means |
| 9 | Operating area |
| 10 | First screen layout |
| 11 | Second screen layout |
| 12 | Presence sensor |

| List of Reference Numerals | |
|---|---|
| 13 | Detection device |
| 14 | Memory |
| 15 | Reading device |
| 16 | Information carrier |
| 17 | Camera |
| 18 | Imaging sensor |
| 19 | Infrared proximity sensor |
| 20 | Ultrasound proximity sensor |
| 21 | Light barrier |
| 22 | Tread mat |
| 23 | |
| 24 | |
| 25 | |

The invention claimed is:

1. Method for operating an electrically controllable technical device (1),
   comprising a signal- and data-processing control device (2), a control panel (4) operatively connected to the control device (2) and combined structurally with the control device (2) or provided separately from the control device (2) with input means (6) for the delivery of control commands to the technical device (1) as well as for the input of data into the control device (2) by an operator (7),
   which control panel (4) comprises a graphical output means (8) for representing portions of all of the available information for an operator (7), including of status information on the operational or process status of the controllable, technical device (1), comprising
   providing at least one first screen layout (10), which is designed for showing a first portion of information on the graphical output means (8) and is provided for viewing from an immediate operating area (9) of the control panel (4);
   providing at least one second screen layout (11), which is designed for showing a second portion of information on the graphical output means (8) and is provided for viewing from outside an immediate operating area (9) of the control panel (4) or the technical device (1);
   automated detection of the presence and /or absence of a person in the immediate operating area (9) of the control panel (4) or the technical device (1); and
   automated switching between the first and second screen layout (10, 11) by way of the established status concerning the presence and/or absence of a person in the immediate operating area (9) of the control panel (4) or the technical device (1).

2. Method according to claim 1, wherein having established the presence of an operator (7) who is authorized to operate the technical device (1) or the control device (2) in the immediate operating area (9) of the control panel (4) it is switched to the first screen layout (10).

3. Method according to claim 1, wherein having established the absence of a person in the immediate operating area (9) of the control panel (4) it is switched to the second screen layout (11).

4. Method according to claim 1, wherein to establish the presence of an operator (7) the activation of an input means (6) of the control panel (4) is established.

5. Method according to claim 1, wherein to establish the absence of an operator (7) the absence of operational actions on the input means (6) of the control panel (4) during a defined first time period is established.

6. Method according to claim 5, wherein the defined first time period can be adjusted.

7. Method according to claim 1, wherein to establish the presence and/or absence of a person within the immediate operating area (9) a signal or status information of a presence sensor (12), in particular a proximity sensor, is evaluated.

8. Method according to claim 7, wherein on activating an input means (6) of the control panel (4) a function check or plausibility check of the function of the presence sensor (12) is performed.

9. Method according to claim 1, wherein the automatic switching between the first and the second screen layout (10, 11) - and vice versa - or the automatic change between a first and a second format on the graphic output means (8) can be deactivated by a predefined operational action or parameter setting, so that the first or second screen layout (10, 11) is set permanently independently of the presence or absence of a person.

10. Method according to claim 1, wherein the first portion of information has a comparatively greater degree of detail or information depth than the second portion of information.

11. Method according to claim 1, wherein the second portion of information is formed by a portion of the first portion of information.

12. Method according to claim 1, wherein after the expiry of a second time period, within which the absence of persons is continually determined, a screen of the graphical output means (8) is darkened or switched off automatically, and if subsequently the presence of a person is determined within the operating area (9) of the control panel (4) or within a defined surrounding area around the technical device (1) the first or second screen layout (10, 11) respectively is re-established automatically.

13. Method according to claim 12, wherein during or immediately after the darkening or switching off of the screen hardware components for the output of information on the screen are also switched off or put into a power saving mode.

14. Method according to claim 1, wherein in addition to determining information about the presence of a person also information can be obtained or determined about the identity or authorization of the respective person.

15. Method according to claim 14, wherein a personal identification or authorization check of persons is performed by means of a reading device (15) for contact-free determinable information carriers (16),.

16. Method according to claim 14, wherein a personal identification or authorization check of persons is performed by means of a camera (17) or an imaging sensor (18) and software for image or object identification.

17. Control device for an electrically controllable technical device (1),
comprising a programmable control device (2), and a control panel (4) operatively connected to the control device (2) which is combined structurally with the control device (2) or provided separately from the control device (2) and comprises input means (6) for the delivery of control commands to the controllable technical device (1) as well as for the input of data into the control device (2) by an operator (7),
which control panel (4) comprises a graphical output means (8) for representing portions of all of the available information, including of status information on the operational or process status of the controllable, technical device (1), which information is provided for inspection by an operator (7) and wherein
by the control device (2) at least one first screen layout (10) for a first screen view of a first portion of all available information can be retrieved from a memory (14) and said first screen view is provided for observing information from the immediate vicinity of the control panel, within an operating area (9) of the control panel (4) or the technical device (1), wherein
by the control device (2) in addition at least one second screen layout (11) for a second screen view of a portion of available information can be retrieved from a memory (14), whereby said second screen view is provided for viewing from outside the immediate operating area (9) of the control panel (4) or the technical device (1),
wherein a detection device (13) operationally connected to the control device or functionally integrated into the control device (2) is designed for determining the presence and/or absence of a person in the immediate operating area (9) of the control panel (4), and
wherein as a function of a detection value or output signal of the detection device (13) it is switched automatically between the first and second screen layout (10, 11) such that
having established the presence of a person in the immediate operating area (9) of the control panel (4) information is output on the graphical output means (8) of the control panel (4) according to the first screen layout (10), and wherein
if no one is present in the immediate operating area (9) of the control panel (4) information is output on the graphical output means (8) according to the second screen layout (11).

18. Control device according to claim 17, wherein the control device (2) is operationally connected to at least one detecting device (13) for determining the presence or absence of an operator (7) authorized to operate the technical device (1) or the control device (2) or is structurally combined with at least one such detection device (13).

19. Control device according to claim 17, wherein the detection device (13) comprises at least one presence sensor (12), which is designed for detecting the presence of general persons or authorized operators (7) in the vicinity of the control panel (4).

20. Control device according to claim 19, wherein the control device (2) or the detection device (13) is designed for evaluating an output signal or a result of the presence sensor (12) and the presence sensor (12) comprises a response hysteresis with an upper and a lower switching threshold.

21. Control device according to claim 17, wherein the first screen layout (10) is used for the representation of information with largely smaller character sizes and/or graphics than the second screen layout (11).

22. Control device according to claim 19, wherein the presence sensor (12) is at least one infrared proximity sensor (19).

23. Control device according to claim 19, wherein the presence sensor (12) is at least one ultrasound proximity sensor (20).

24. Control device according to claim 19, wherein the presence sensor (12) is at least one imaging sensor (18), in particular a CCD module or a camera (17).

25. Control device according to claim 19, wherein the presence sensor (12) is at least one weight-sensitive tread mat (22).

26. Control device according to claim 19, wherein the presence sensor (12) is formed by at least one light barrier (21).

27. Control device according to claim 19, wherein the presence sensor (12) is at least one transponder reading device (15).

28. Control device according to claim 19, wherein the presence sensor (12) is at least one barcode reading device (15).

29. Control device according to claim 17, wherein the control device (2), the detection device (13) or the presence sensor (12) is designed such that a response threshold of the presence sensor (12), can be parameterized.

30. Control device according to claim 29, wherein the control device (2), the detection device (13) or the presence sensor (12) is designed such that the response threshold is adjusted automatically during the operation of an input means (6) of the operating panel (4) by way of the thereby established output signal or result of the presence sensor (12).

* * * * *

UNITED STATES PATENT AND TRADEMARK OFFICE
CERTIFICATE OF CORRECTION

PATENT NO.       : 8,483,851 B2                                             Page 1 of 1
APPLICATION NO.  : 12/736529
DATED            : July 9, 2013
INVENTOR(S)      : Stummer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 480 days.

Signed and Sealed this
Eighth Day of September, 2015

Michelle K. Lee
*Director of the United States Patent and Trademark Office*